United States Patent
Wilhelm

(10) Patent No.: US 7,814,544 B1
(45) Date of Patent: Oct. 12, 2010

(54) API-PROFILE GUIDED UNPACKING

(75) Inventor: Jeffrey Wilhelm, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1141 days.

(21) Appl. No.: 11/473,457

(22) Filed: Jun. 22, 2006

(51) Int. Cl.
*G06F 11/00* (2006.01)
*G06F 13/00* (2006.01)

(52) U.S. Cl. ......................................... 726/22; 719/328

(58) Field of Classification Search .................. 726/22, 726/23, 24, 26–27; 713/165, 188; 703/23; 707/205; 717/127, 135; 719/328, 330, 331
See application file for complete search history.

(56) References Cited

U.S. PATENT DOCUMENTS

| | | | |
|---|---|---|---|
| 6,192,512 B1 * | 2/2001 | Chess | 717/127 |
| 6,775,780 B1 * | 8/2004 | Muttik | 726/24 |
| 6,931,540 B1 * | 8/2005 | Edwards et al. | 713/188 |
| 7,134,142 B2 * | 11/2006 | Smith | 726/24 |
| 7,349,931 B2 * | 3/2008 | Horne | 1/1 |
| 7,526,805 B2 * | 4/2009 | Chu et al. | 726/22 |
| 7,559,091 B2 * | 7/2009 | Chu et al. | 726/27 |
| 7,577,997 B2 * | 8/2009 | Chu et al. | 726/26 |
| 2003/0074573 A1 * | 4/2003 | Hursey et al. | 713/200 |
| 2003/0115479 A1 * | 6/2003 | Edwards et al. | 713/200 |
| 2003/0196103 A1 * | 10/2003 | Edwards et al. | 713/200 |
| 2003/0233566 A1 * | 12/2003 | Kouznetsov et al. | 713/200 |
| 2004/0015712 A1 * | 1/2004 | Szor | 713/200 |
| 2004/0209608 A1 * | 10/2004 | Kouznetsov et al. | 455/418 |
| 2005/0108562 A1 * | 5/2005 | Khazan et al. | 713/200 |
| 2005/0154900 A1 * | 7/2005 | Muttik | 713/188 |
| 2005/0172337 A1 * | 8/2005 | Bodorin et al. | 726/22 |
| 2006/0179484 A1 * | 8/2006 | Scrimsher et al. | 726/23 |
| 2009/0126017 A1 * | 5/2009 | Chahal | 726/23 |

OTHER PUBLICATIONS

John Ogness, Dazuko: An Open Solution to Facilitatre 'On-Access' Scanning, Sep. 2003, Virus Bulletin Conference, pp. 1-5.*
Nachenberg, C., U.S. Appl. No. 10/404,756, filed Mar. 31, 2003, entitled "Function Call Initiated Memory Scanning and Stack State Analysis System and Method" (27 pages, 4 shts).

(Continued)

*Primary Examiner*—Christopher A Revak
*Assistant Examiner*—Abdullah Almamun
(74) *Attorney, Agent, or Firm*—Gunnison, McKay & Hodgson, L.L.P.; Forrest Gunnison

(57) ABSTRACT

An executable program including packed code is launched in an API-monitored environment, such as a sandboxed environment, in which each call to an API issued by the executable program is intercepted. A packer API profile list including one or more packer API profiles identifying associated sets of one or more APIs utilized by an associated known packer to unpack packed code is accessed. The executable program is allowed to run so long as the executable program issues calls to APIs within an API set of a packer API profile in the packer API profile list. When the executable program issues a call to an API not within an API set of a packer API profile in said packer API profile list, the packed code is assumed to be unpacked in memory as a memory image. The memory image is evaluated, e.g., scanned, for malicious code, and upon detection of malicious code, protective action is taken.

11 Claims, 5 Drawing Sheets

OTHER PUBLICATIONS

Abril, Eduardo, "Unpacking by Code Injection", CodeBreakers Journal, vol. 1, Issue 1, Mar. 2006, pp. 1-27 [online]. Retrieved on May 31, 2006. Retrieved from the Internet:<URL:http://www.codebreakers-journal.com/index.php/CodeBreakersJournal/article/view/17/17>.

Evron, Gadi, "Vulnerability Development: Re: unpacking UPX or PE-packed binaries", posting of Apr. 23, 2004, pp. 1-3 [online]. Retrieved on May 31, 2006. Retrieved from the Internet:<URL:http://seclists.org/lists/vuln-dev/2004/Apr/0026.html>.

Heller, Thomas, "[Python-Dev] an idea for improving struct.unpack api", posting of Jan. 6, 2005, pp. 1-2 [online]. Retrieved on May 31, 2006. Retrieved from the Internet:<URL:http://mail.python.org/pipermail/python-dev/2005-January/050735.html>.

No author given, "PE Explorer UPX Unpacker Plug-in", pp. 1-2 [online]. Retrieved on May 31, 2006. Retrieved from the Internet:<URL:http://www.heaventools.com/PE_Explorer_plug-ins.htm>.

No author given, "Security Alert", Jan. 13, 2006, pp. 1-2 [online]. Retrieved on May 31, 2006. Retrieved from the Internet:<URL:http://securityreason.com/securityalert/342>.

No author given, "Unpacker win 32", pp. 1-4 [online]. Retrieved on May 31, 2006. Retrieved from the Internet:<URL:http://www.freedownloadscenter.com/Best/unpacker-win32.html>.

* cited by examiner

API-PROFILE GUIDED UNPACKING

BACKGROUND

1. Field of the Invention

The present invention relates to computer system security. More particularly, the present invention relates to a system and method of unpacking code that has been obfuscated with a packer on a computer system.

2. Description of the Related Art

Malicious code writers are increasingly using packers, such as run time packers, to obfuscate malicious code files and avoid detection of the malicious code files on computer systems. A packer is a tool that can be used to compress and/or obfuscate code, such as an executable malicious code file.

Typically a packer compresses, encrypts, or otherwise obfuscates, the code of an original executable file and appends on a small unpacking routine that is not packed. When the executable file starts up, the unpacking routine initially runs and decompresses the compressed original executable file in memory. When the unpacking routine is completed, the original executable file is in memory, e.g., as a memory image.

The process of packing a malicious code file changes the appearance of the malicious code file so that the malicious code file does not appear the same to an anti-virus (AV) engine as it did before. Thus, known malicious code signatures used by the AV engine will no longer match the packed malicious code file. Consequently, the packed malicious code file cannot be detected by the AV engine. When an AV engine cannot remove, or "unpack" the layers of obfuscation resulting from the packing process, a new malicious code signature needs to be created each time the malicious code file is re-packed.

Additionally, creating an unpacker, i.e., a program for unpacking the packed code, for use by an AV engine is a difficult task that currently requires an expert analyst to manually reverse-engineer the packing. Typically, each unpacker is unique and must be specifically created for each packer. This approach requires considerable time and effort, and can be very brittle. Malicious code writers can often avoid unpacking simply by changing a few bytes in the appended unpacking routine's start up code, so that the modified unpacking routine can no longer be identified as the original packer.

The rate at which malicious code writers can create packers exceeds the rate at which engineers can create unpackers, leading to a dangerous backlog of unsupported packer formats. Malicious code writers are aware of this difficulty and have begun employing an ever-growing number of packers to hide malicious code files and avoid detection by AV products.

Debugger-based unpacking is one example of a current unpacking technique that attempts to provide a more generic approach to unpacking packed files. In debugger-based unpacking, a breakpoint, or set of breakpoints, is placed on the expected entry point of an unpacked executable file. For executables running on WINDOWS systems, this is typically near 0x00400000. (WINDOWS is a registered trademark of Microsoft Corporation in the United States and other countries. A WINDOWS system is a computer system running a WINDOWS operating system.) Upon reaching the breakpoint, program execution is stopped and control of the program transferred to the debugger.

The program can be analyzed and/or scanned for malicious code. While debugger-based unpacking is typically suitable for certain older packer families, debugger-based unpacking has begun to lose its effectiveness. An increasing majority of newer packers employ anti-debug methods, such as debugger detection and exception handling, which cause debugger-based unpacking to fail. In such cases, the debugger may lose control of the program under analysis with unpredictable results.

SUMMARY OF THE INVENTION

Embodiments in accordance with the invention provide an automated, generalized method for unpacking packed code, so that the packer-generated obfuscation surrounding the original code is removed, and the original code recovered and compared against existing AV malicious code signatures. More particularly, embodiments in accordance with the invention provide automated API-monitored unpacking of a packed executable file.

Embodiments in accordance with the invention allow API calls issued by a program to be inspected before actually being executed. Potentially unsafe API calls can be blocked, and the program issuing the API calls can be terminated if so desired. As a debugger is not used, embodiments in accordance with the invention are not susceptible to anti-debug methods and support exception handling.

In accordance with one embodiment, an executable program including packed code is launched in an API-monitored environment in which each call to an API issued by the executable program is intercepted prior to execution. The executable program is allowed to execute, so long as each call to an API issued by the executable program is within an API set of a packer API profile in a packer API profile list. When the executable program issues a call to an API not within an API set of a packer API profile in the packer API profile list, it is assumed that unpacking is complete and execution of the executable program is stopped.

A memory image of the unpacked code generated during unpacking is evaluated, e.g., scanned, for malicious code. Upon detection of malicious code, protective action is taken, such as quarantining, or deleting the executable program and/or the malicious code. In some embodiments, a notification is provided to a user, system administrator, and/or security center.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
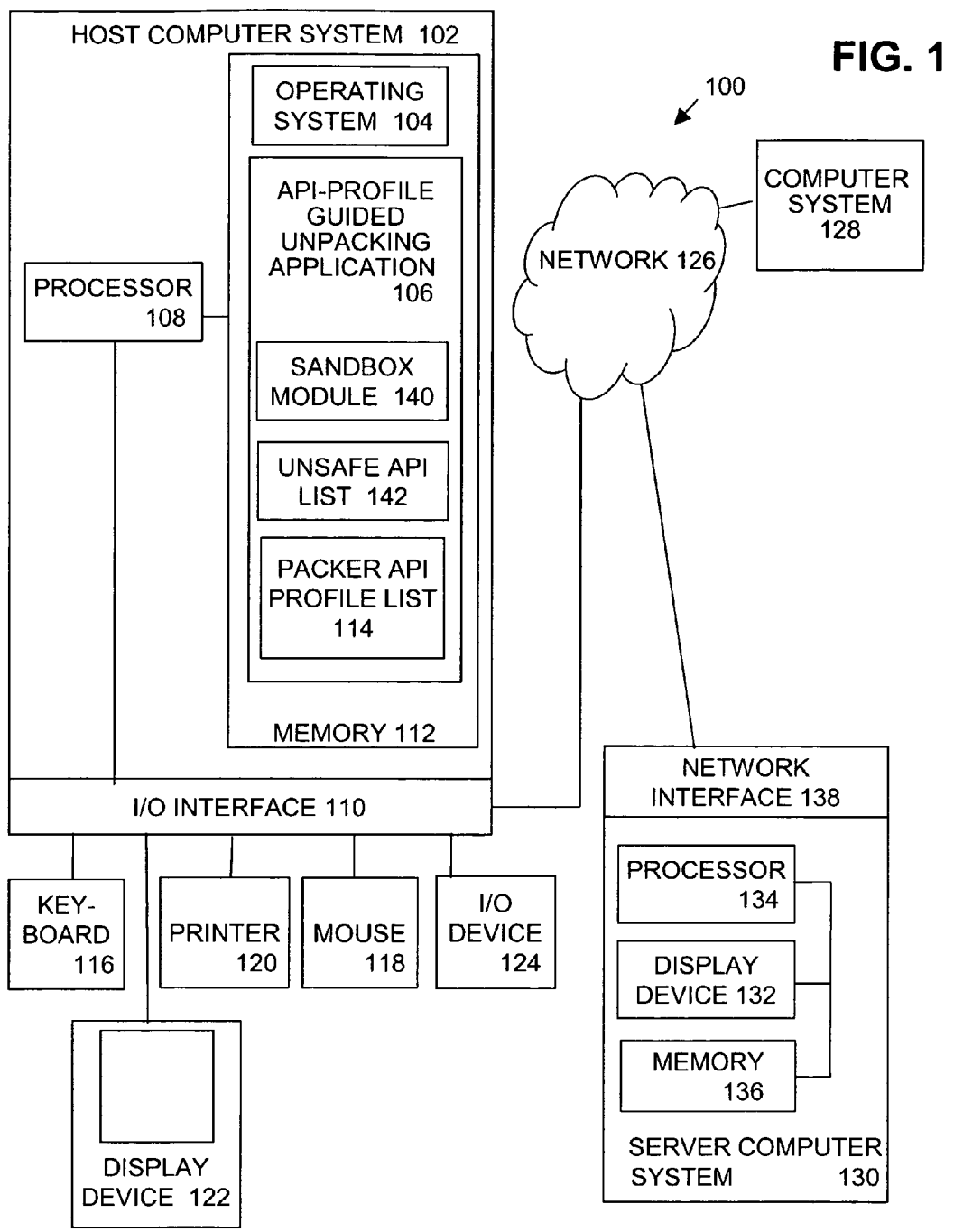
FIG. 1 is a diagram of a client-server system that includes an API-profile guided unpacking application executing on a host computer system in accordance with one embodiment of the present invention.

Most known packer families rely on a small subset of application program interfaces (APIs) for unpacking packed code that typically differ from the set of APIs called during the start up of a normal program, i.e., a non-packed program. For example, in a WINDOWS operating system environment, the set of APIs initially relied on by some packer families for unpacking a packed file may include APIs associated with memory allocation, e.g., HeapAlloc( ) and MemAlloc( ), function address resolution, e.g., LoadLibrary( ) and GetProcAddress( ), and/or memory manipulation, e.g., MemCopy( ) and MemMove( ). Differently, a normal program typically starts up with initialization APIs, e.g., CreateWindow( ) or InitCommonControls( ).

Embodiments in accordance with the invention utilize a packer API profile list including at least one packer API profile for a known packer. In one embodiment, the packer API profile consists of a set of APIs called by the associated packer code to unpack packed code prior to running the packed code. Herein the associated packer code is code appended to a packed file(s) by a packer that unpacks the packed code. Capturing an API profile for a packer, i.e., a packer API profile, is typically easier than writing a full unpacker.

An executable program including packed code is launched, e.g., execution is initiated, in an API-monitored environment, such as in a sandbox. The executable program is allowed to run so long as the executable program executes only APIs within the API set of a known packer in the packer API profile list. When an API is outside of the API set of a known packer in the packer API profile list, the unpacked body of the executable program is assumed to be reached and is unpacked in memory as a memory image. This memory image can then be scanned for known malicious code signatures, such as by an AV application. Herein, in one embodiment, malicious code is defined as any computer program, file, module, set of modules, or code that enters a computer system environment without an authorized user's knowledge and/or without an authorized user's consent. A computer virus is one example of a malicious code.

The use of the packer API profiling allows obfuscated executable files to be automatically unpacked without manual intervention, making some embodiments suitable for use on client machines. Additionally, the use of API monitoring adds only a small amount of overhead allowing high performance. Further, as the API monitoring is performed at the API level, embodiments in accordance with the invention are not vulnerable to traditional binary anti-emulation and anti-debug techniques. Although malicious code is allowed to run directly on the host machine, the API monitoring mediates access to any dangerous system calls, allowing the dangerous system calls and/or the executable program to be blocked and/or terminated.

Referring generally to FIGS. 2A, 2B, 2C, and 2D and method 200, in accordance with one embodiment, an executable program including packed code is received (operation 204) and sandboxed in an API-monitored environment, so that APIs issued by the executable program are intercepted prior to execution (operation 206). A packer API profile list is accessed (operation 208), and each packer API profile in the packer API profile list is initially set as valid (operation 210).

The executable program is launched in the API-monitored environment (operation 212), and a call to an API is intercepted and stalled prior to execution (operation 214). An initial packer API profile in the packer API profile list is selected (operation 216), and a determination is made whether or not the packer API profile is set as valid (operation 218).

If the packer API profile is not set as valid, a determination is made whether a next packer API profile is present in the packer API profile list (operation 224). If a next packer API profile is present in the packer API profile list, a next packer API profile in the packer API profile list is selected (return to operation 216).

Alternatively, if the packer API profile is set as valid, a determination is made whether or not the called API is identified in the selected packer API profile (operation 220). If the called API is present in the selected packer API profile, the selected packer API profile remains set as valid, and a determination is made whether a next packer API profile is present in the packer API profile list (operation 224), earlier described.

Alternatively, if the called API is not present in the selected packer API profile, the packer API profile is set as invalid (operation 222), and a determination is made whether a next packer API profile is present in the packer API profile list (operation 224), earlier described.

If a next packer API profile is not present in the packer API profile list, the called API has been compared to each of the packer API profiles in the packer API profile list. A determination is made whether or not there is at least one packer API profile in the packer API profile list remaining set as valid, indicating the called API was identified in at least one packer API profile (operation 226). If at least one packer API profile remains set as valid, a determination is made whether the call to the API is safe (operation 228). If the call to the API is determined to be safe, the call to the API is allowed to execute (operation 230), and control is returned to the executable program, until receipt of a next call to an API issued from the executable program (return to operation 214).

Otherwise, if the call to the API is not determined to be safe, a determination is made whether or not to emulate the call to the API (operation 232). If the call is emulated (operation 234), the call does not get forwarded to the operating system. Instead, the call is emulated and the results of the emulation are returned directly to the program making the call (return to operation 214). Alternatively, if the call to the API is not emulated, the executable program is evaluated for malicious code (operation 238).

Alternatively, when at least one packer API profile is not set as valid, indicating the called API is not identified in any of the packer API profiles in the packer API profile list, it is assumed that the packed code is unpacked in memory, e.g., as a memory image. The memory image is evaluated for malicious code (operation 238), and a determination made whether malicious code is detected (operation 240). If malicious code is detected, protective action is taken (operation 242), and optionally a notification generated (operation 244), otherwise processing exits method 200 (operation 246), or waits for receipt of a next executable program (return to operation 204).

More particularly, FIG. 1 is a diagram of a client-server system 100 that includes an API-profile guided unpacking application 106 executing on a host computer system 102 in accordance with one embodiment of the present invention. Host computer system 102, sometimes called a client or user device, typically includes a central processing unit (CPU) 108, sometimes called a processor 108, an input/output (I/O) interface 110, and a memory 112. Host computer system 102 further includes standard devices like a keyboard 116, a mouse 118, a printer 120, and a display device 122, as well as one or more standard input/output (I/O) devices 124, such as a compact disk (CD) or DVD drive, floppy disk drive, or other digital or waveform ports for inputting data to and outputting data from host computer system 102.

In one embodiment, API-profile guided unpacking application 106 is loaded into host computer system 102 via I/O device 124, such as from a CD, DVD, or floppy disk containing API-profile guided unpacking application 106. In one embodiment, API-profile guided unpacking application 106 includes: a packer API profile list 114; a sandbox module 140; and an unsafe API list 142.

In one embodiment, packer API profile list 114 is a listing, database, or other collection of one or more packer API profiles. In one embodiment, a packer API profile includes a set of one or more APIs called by an associated packer program prior to running packed code and is used to unpack the packed code. In one embodiment, each packer API profile in packer API profile list 114 further includes a validity indicator, such as a bit value, that indicates whether or not the associated packer API profile is valid.

Each packer API profile can be obtained using a variety of techniques. For example, a packer API profile is obtained by binary analysis, reverse engineering of a packer program, determined experimentally by packing a large number of known samples and comparing API call traces between packed and original versions of a program, or by other means. In some embodiments, packer API profile list 114 is separate from but accessible by API-profile guided unpacking application 106. In one embodiment, packer API profile list 114 is updatable, such as from a server computer system 130 or via I/O device 124.

In one embodiment, sandbox module 140 is an application or driver, such as a kernel mode driver, that isolates a received executable program in an API-monitored virtual environment. In particular, in one embodiment, sandbox module 140 creates a virtual environment in which calls to APIs issued by an executable program are intercepted and stalled prior to execution by an associated operating system function on host computer system 102. This allows the executable program to be automatically unpacked in accordance with embodiments of the invention as further described herein and evaluated for malicious code. In some embodiments, the call to the API can be released for execution, while in other embodiments the call to the API can be emulated, terminated, or other protective action taken.

In some embodiments, sandbox module 140 further includes an emulation module (not shown) to allow selected calls to APIs to execute in a protected environment so that damage to host computer system 102 is prevented. In some embodiments, the emulation module generates and returns a false response to the calling code, so that the calling code receives an expected response and is not alerted to interception of the call to the API.

Sandboxing of executable applications and emulation of calls to APIs are well known to those of skill in the art, and any of a variety of techniques can be used by sandbox module 140 to isolate the executable program in an API-monitored environment. For example, in one embodiment, sandbox module 140 hooks one or more operating system functions on host computer system 102 callable by APIs utilized by an executable program, such as in a dynamic linked library (DLL), or system call table.

In one embodiment, unsafe API list 142 is a listing, database, or other collection of one or more entries of unsafe API(s). In one embodiment, an unsafe API entry identifies an API determined to be unsafe, for example, as an API that when executed may cause harm to host computer system 102 or to another computer system. In one embodiment, each unsafe API entry in unsafe API list 142 further includes an emulation indicator, such as a bit value, which indicates whether or not the associated unsafe API should be emulated.

Each unsafe API entry can be obtained using a variety of techniques. For example, an unsafe API entry is obtained by analysis of the effects of a call to the unsafe API by a virus analyst, or by other means. In some embodiments, unsafe API list 142 is separate from but accessible by API-profile guided unpacking application 106. In one embodiment, unsafe API list 142 is updatable, such as from server computer system 130 or via I/O device 124.

In one embodiment, host computer system 102 is coupled to server computer system 130 of computer system 100 by a network 126. Server computer system 130 typically includes a display device 132, a processor 134, a memory 136, and a network interface 138. Additional computer systems, such as computer system 128, can also be associated with network 126. Network 126 can be any network or network system that is of interest to a user. In various embodiments, network interface 138 and I/O interface 110 include analog modems, digital modems, or a network interface card.

API-profile guided unpacking application 106 is stored, for example, in memory 112 of host computer system 102 and executed on host computer system 102. The particular type of and configuration of host computer system 102, server computer system 130, and computer system 128 are not essential to this embodiment of the present invention.

FIG. 2 is a flow diagram of an API-profile guided unpacking method 200 for automatically unpacking packed code and detecting malicious code in accordance with one embodiment of the present invention. Referring now to FIGS. 1 and 2A together, in one embodiment, execution of API-profile guided unpacking application 106 by processor 108 results in the operations of API-guided unpacking method 200 as described below. In one embodiment, method 200 is entered at an ENTER operation 202, and from ENTER operation 202, processing transitions to a RECEIVE EXECUTABLE PROGRAM operation 204.

In RECEIVE EXECUTABLE PROGRAM operation 204, in one embodiment, an executable program is received by API-profile guided unpacking application 106. In one embodiment, the executable program includes at least a portion of packed code. From RECEIVE EXECUTABLE PROGRAM operation 204, processing transitions to a SANDBOX EXECUTABLE PROGRAM operation 206.

In SANDBOX EXECUTABLE PROGRAM operation 206, in one embodiment, the executable program is sandboxed, for example by sandbox module 140, so that calls to APIs issued by the executable program are hooked, or otherwise monitored, to allow interception of a call to an API prior to the execution of the call to the API by the operating system, e.g., operating system 104. From SANDBOX EXECUTABLE PROGRAM operation 206, processing transitions to an ACCESS PACKER API PROFILE LIST operation 208.

In ACCESS PACKER API PROFILE LIST operation 208, in one embodiment, a packer API profile list, is accessed, for example, packer API profile list 114 (FIG. 1). From ACCESS PACKER API PROFILE LIST operation 208, processing transitions to a SET EACH PACKER API PROFILE AS VALID operation 210.

In SET EACH PACKER API PROFILE VALID operation 208, each packer API profile in packer API profile list 114 is set, or otherwise indicated, as valid. In one embodiment, a validity bit associated with each packer API profile is initially set to indicate the packer API profile as valid. For example, in one embodiment, a validity indicator of one (1) bit is set to one (1) indicating the associated packer-API profile is valid. From SET EACH PACKER API PROFILE AS VALID operation 210, processing transitions to a LAUNCH EXECUTABLE PROGRAM operation 212.

In LAUNCH EXECUTABLE PROGRAM operation 212, the executable program sandboxed in operation 206 is launched, e.g., execution is initiated, within the API-monitored environment established by sandbox module 140. From LAUNCH EXECUTABLE PROGRAM operation 212, processing transitions to an INTERCEPT CALL TO API operation 214.

In INTERCEPT CALL TO API operation 214, in one embodiment, a call to an API issued by the executable program is intercepted. For example, a call to an API issued by the executable program is redirected to API-profile guided unpacking application 106, or to a module of API-profile guided unpacking application 106, such as sandbox module 140, where the call to the API is stalled. From INTERCEPT CALL TO API operation 214, processing transitions to a SELECT PACKER API PROFILE operation 216.

Figure 2A:
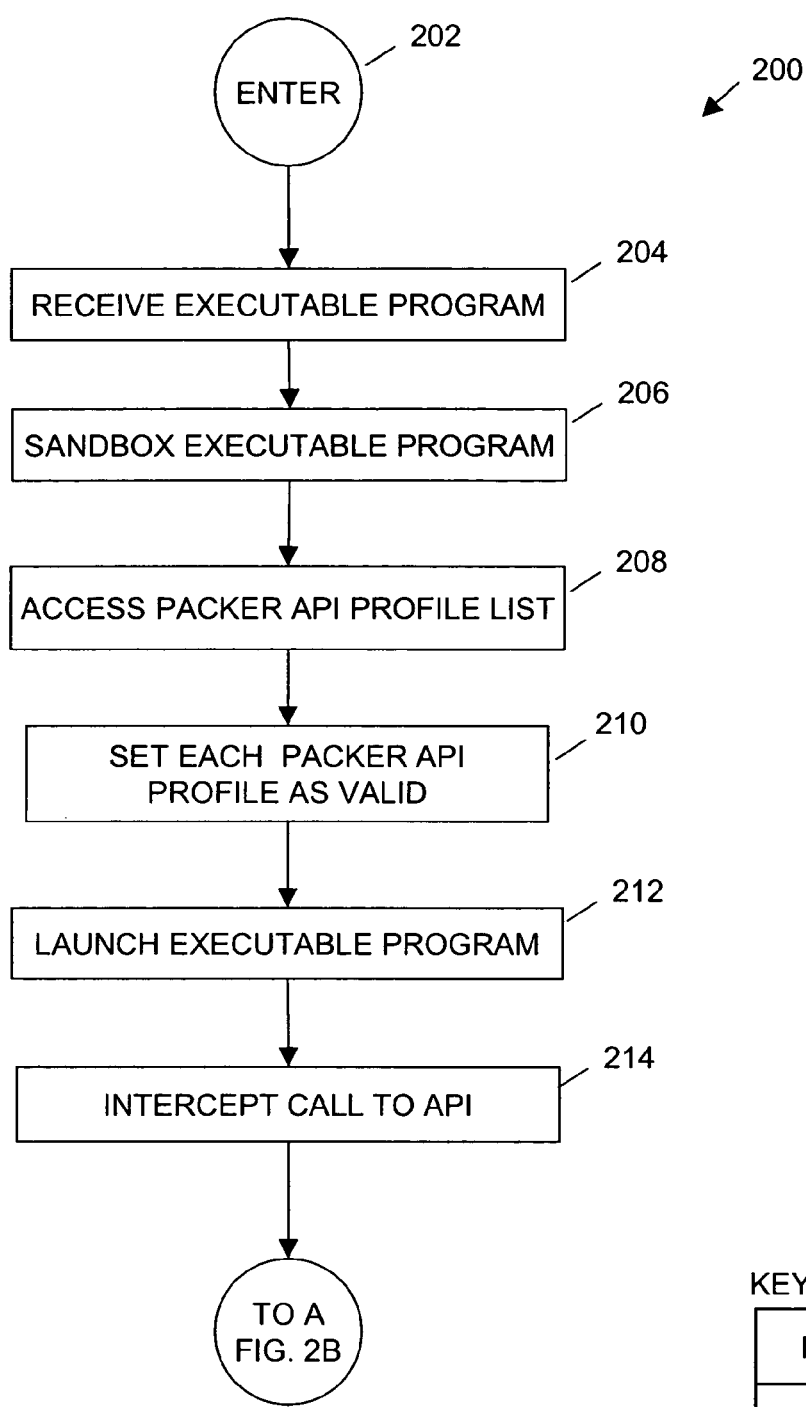
FIG. 2 is a key to FIGS. 2A, 2B, 2C, and 2D that illustrate a flow diagram of an API-profile guided unpacking method for automatically unpacking packed code and detecting malicious code in accordance with one embodiment of the present invention.
Figure 2B:
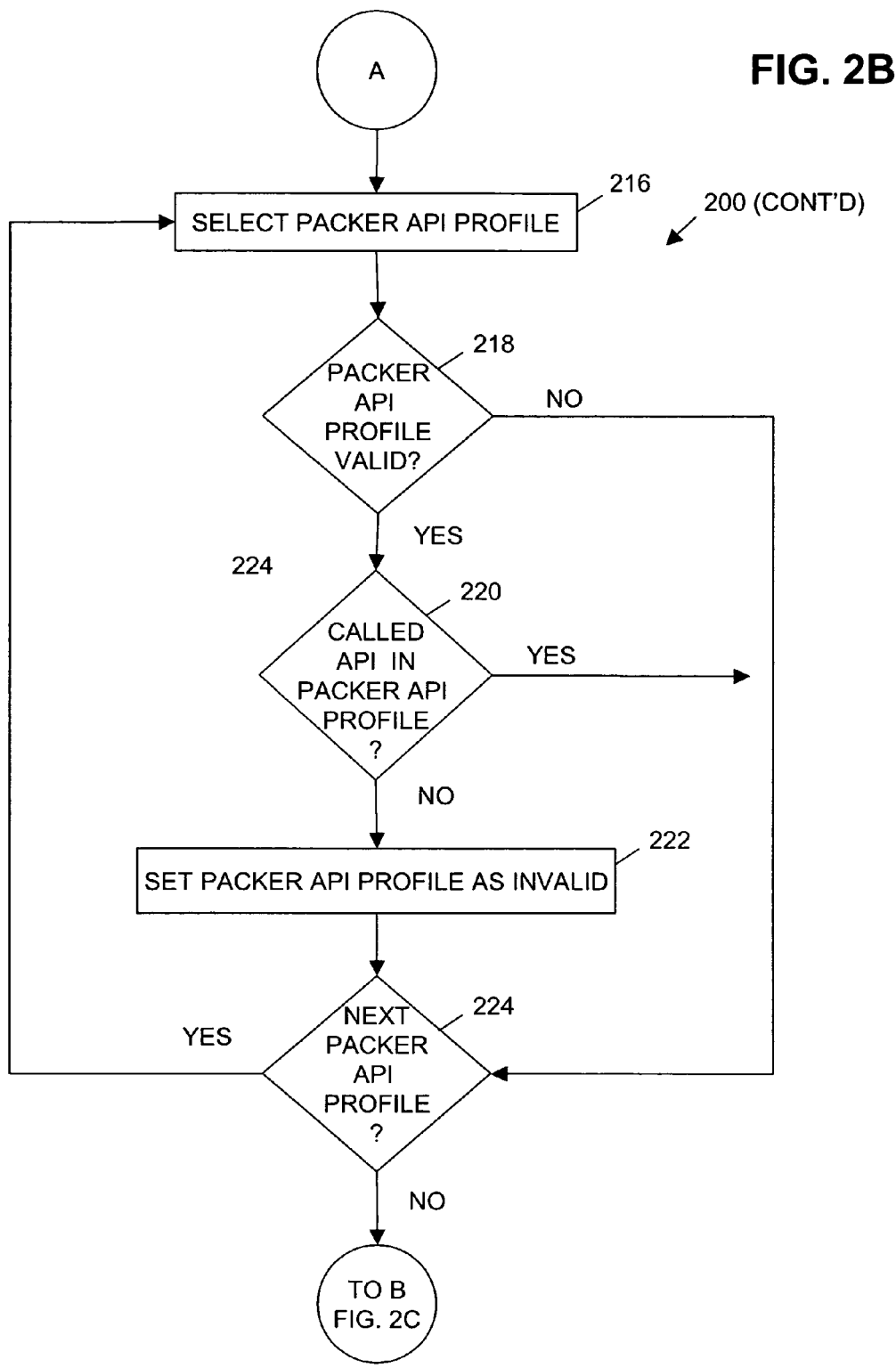

Referring now to FIG. 2B, in SELECT PACKER API PROFILE operation 216, in one embodiment, a packer API profile is selected from the packer API profile list, e.g., packer API profile list 114. In one embodiment, a first packer API profile is initially selected from packer API profile list 114. From SELECT PACKER API PROFILE operation 216, processing transitions to a PACKER API PROFILE VALID check operation 218.

In PACKER API PROFILE VALID check operation 218, the packer API profile selected in operation 216 is evaluated to determine whether or not the packer API profile is valid. In one embodiment, the validity indicator associated with the selected packer API profile is evaluated to determine whether or not the packer API profile is valid. Continuing the earlier example, if the validity indicator associated with the selected packer API profile is set to one (1), the packer API profile is valid. Otherwise, if the validity indicator is set to zero (0), the packer API profile is not valid, i.e., is invalid.

If the packer API profile is not valid ("NO"), processing transitions from PACKER API PROFILE VALID check operation 218 to a NEXT PACKER API PROFILE check operation 224, described further herein. Alternatively, if the selected packer API profile is valid ("YES"), processing transitions from PACKER API PROFILE VALID check operation 218 to a CALLED API IN PACKER API PROFILE check operation 220.

In CALLED API IN PACKER API PROFILE check operation 220, a determination is made whether or not the API identified in the call received in operation 214, herein termed the called API, is one of the set of packer APIs identified in the selected packer API profile. For example, in one embodiment, a determination is made whether the called API matches at least one packer API in the set of packer APIs of the selected packer API profile.

If the called API matches an API in the set of packer APIs of the selected packer API profile ("YES"), the validity indicator of the selected packer API profile remains set as valid, and processing transitions from CALLED API IN PACKER API PROFILE check operation 220 to NEXT PACKER API PROFILE check operation 224, described further herein. Alternatively, if the called API does not match a packer API in the set of packer APIs of the selected packer API profile ("NO"), processing transitions from CALLED API IN PACKER API PROFILE check operation 220 to a SET PACKER API PROFILE AS INVALID operation 222.

In SET PACKER API PROFILE AS INVALID operation 222, the validity indicator of the selected packer API profile is set as invalid, as the called API is not contained in the selected packer API profile. From SET PACKER API PROFILE AS INVALID operation 222, processing transitions to NEXT PACKER API PROFILE check operation 224.

In NEXT PACKER API PROFILE check operation 224, in one embodiment, a determination is made whether or not there is a next packer API profile in packer API profile list 114 to select. If there is a next packer API profile in packer API profile list 114 to be selected ("YES"), from NEXT PACKER API PROFILE check operation 224, processing returns to SELECT PACKER API PROFILE operation 216, with a next packer API profile being selected in packer API profile list 114. Alternatively, if there is not a next packer API profile in the packer API profile list to be selected, e.g., all the packer API profiles in packer API profile list 114 have been selected ("NO"), from NEXT PACKER API PROFILE check operation 224, processing transitions to an AT LEAST ONE PACKER API PROFILE VALID check operation 226, described further herein.

Figure 2C:
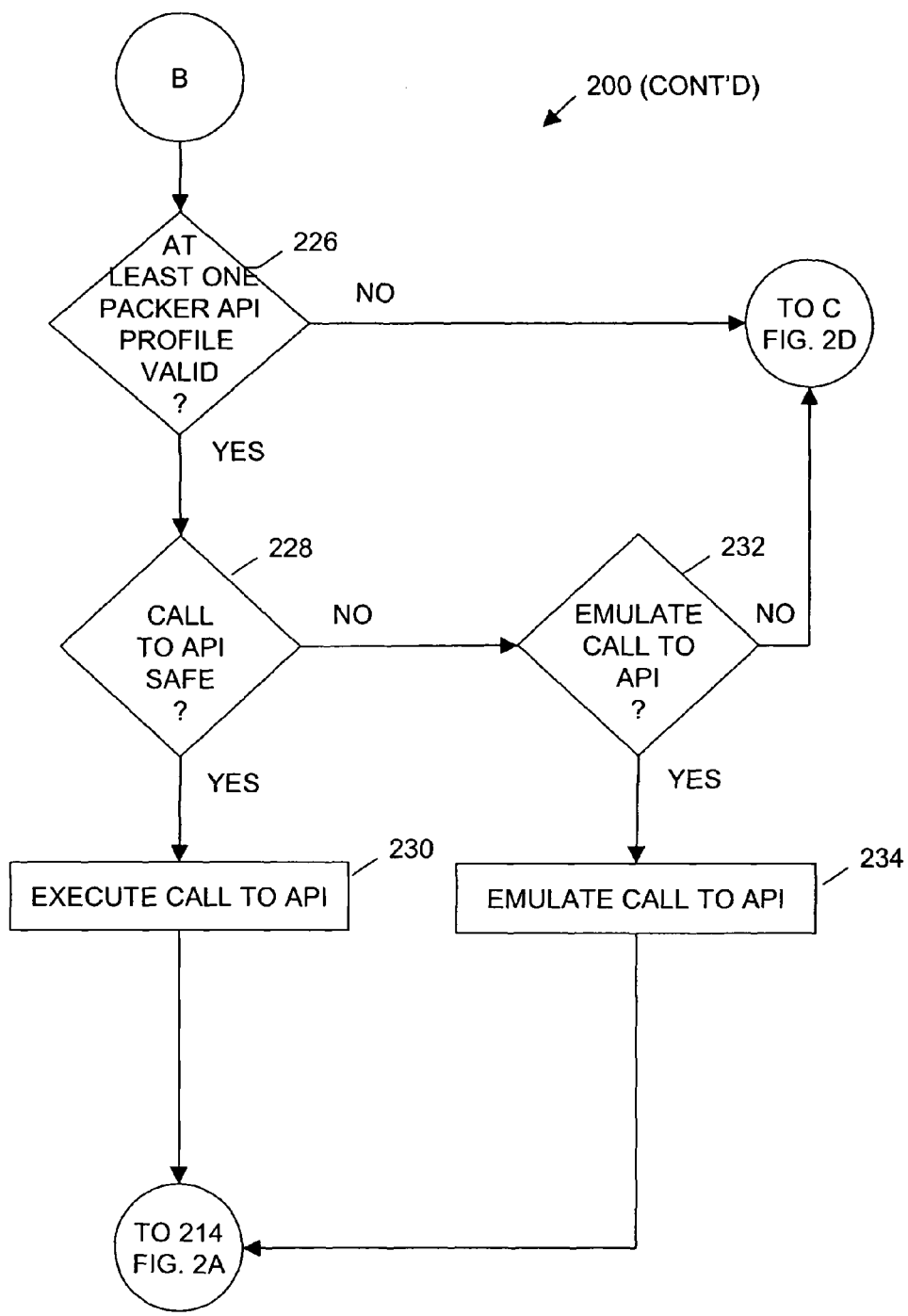

Referring now to FIG. 2C, in AT LEAST ONE PACKER API PROFILE VALID check operation 226, a determination is made whether or not there is at least one packer API profile set as valid in packer API profile list 114. If there is not at least one packer API profile set as valid in packer API profile list 114 ("NO"), it is assumed that the packed portion of the executable program, e.g., the packed code, is unpacked, and processing transitions to an EVALUATE CODE FOR MALICIOUS CODE operation 238 described further herein. Alternatively, if there is at least one packer API profile set as valid in packer API profile list 114 ("YES"), it is assumed that the packed portion of the executable program has not finished unpacking, and processing transitions from AT LEAST ONE PACKER API PROFILE VALID check operation 226 to a CALL TO API SAFE check operation 228.

In CALL TO API SAFE check operation 228, a determination is made whether or not the call to the API received in operation 214 is safe. In one embodiment, the called API is compared to unsafe API entries in unsafe list 142 to determine whether or not the call to the API received in operation 214 is safe.

In one embodiment, if the called API is not listed in unsafe list 142, the call to the API is determined to be safe ("YES"), and processing transitions from CALL TO API SAFE check operation 228 to an EXECUTE CALL TO API operation 230.

In EXECUTE CALL TO API operation 230, the call to the API received in operation 214 is allowed to execute. More particularly, in one embodiment, the call to the API is executed on behalf of the executable program by API-profile guided unpacking application 106. The call proceeds into the operating system allowing the operating system function associated with the called API to execute. From EXECUTE CALL TO API operation 230, execution of the called API returns control to the executable program, and processing returns to operation 214 on receipt of a next call to an API.

Referring again to CALL TO API SAFE check operation 228, alternatively, if the called API matches an unsafe API entry in unsafe API list 142, the call to the API is not determined to be safe ("NO"), and processing transitions from CALL TO API SAFE check operation 228 to an EMULATE CALL TO API check operation 232.

In EMULATE CALL TO API check operation 232, in one embodiment, a determination is made whether to emulate the call to the API determined to be unsafe in operation 228. In one embodiment, an emulation indicator associated with the matched unsafe API entry in the unsafe API list 142 is evaluated to determine whether or not emulation is indicated. In one embodiment, if the associated emulation indicator does not indicate emulation, for example, an emulation indicator bit value is set to zero (0), the called API is not emulated. Alternatively, if the associated emulation indicator indicates emulation, for example an emulation indicator bit value is set to one (1), the called API is emulated.

In an alternative embodiment, API-profile guided unpacking application 106 includes an API emulation list containing API emulation entries. Each API emulation entry identifies an API to be emulated. In one embodiment, if the called API matches an API emulation entry in the API emulation list, the called API is emulated, otherwise the called API is not emulated.

In one embodiment, if emulation is not indicated ("NO"), processing transitions from EMULATE CALL TO API check operation 232 to EVALUATE CODE FOR MALICIOUS CODE operation 238 described further herein. Alternatively, if emulation is indicated ("YES"), from EMULATE CALL TO API check operation 232, processing transitions to an EMULATE CALL TO API operation 234.

In EMULATE CALL TO API operation 234, the unsafe call to the API is placed in a virtual environment, or the call is otherwise emulated, to allow a false response to the call to be generated and returned to the executable program. In one embodiment, the false response is returned to the calling process of the executable program, e.g., a call module, to prevent the calling process from being alerted to the interception of the call to the API, and to allow execution of the executable program to proceed in the API-monitored environment. This allows data to be gathered on the executable program for later use in analysis of the executable program, if so desired. From EMULATE CALL TO API operation 234, processing returns to operation 214 on receipt of a next call to an API.

Referring back again to AT LEAST ONE PACKER API PROFILE VALID check operation 226, as earlier described, when there is not at least one packer API profile set as valid in packer API profile list 114 ("NO"), it is assumed that the packed portion of the executable program is unpacked, and processing transitions to EVALUATE CODE FOR MALICIOUS CODE operation 238.

Figure 2D:
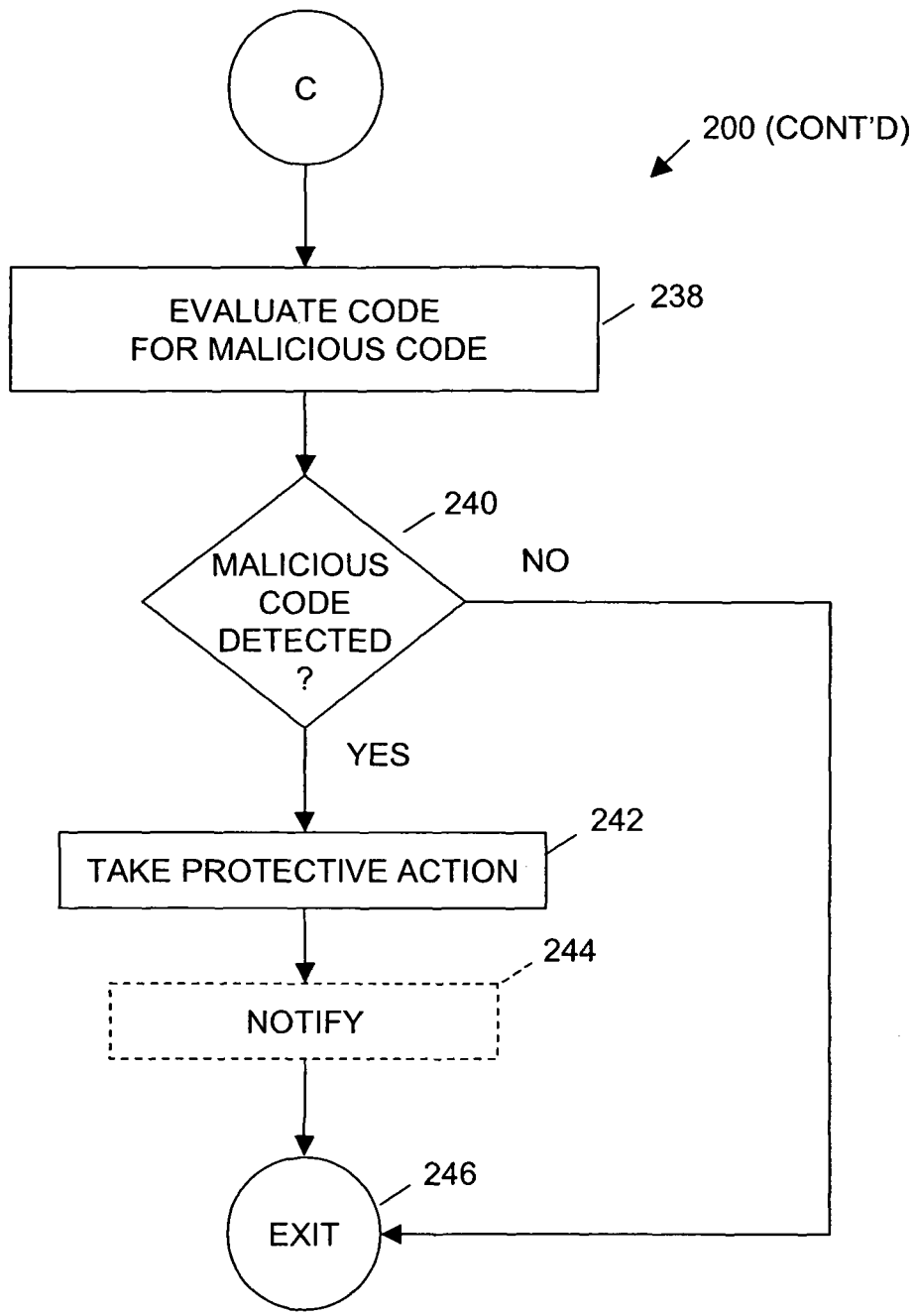

Referring now to FIG. 2D, in EVALUATE CODE FOR MALICIOUS CODE operation 238, the memory image created in memory, e.g., memory 112, during execution of the executable code is evaluated for the presence of malicious code. As it is assumed that that the packed portion of the executable program has been unpacked in memory, the memory image of the unpacked code can now be evaluated for the presence of malicious code. For example, in one embodiment, malicious code detection tools, such as signature scanners, anti-virus heuristics, or other malicious code detection tools, are applied to the memory image, e.g., the unpacked code. From EVALUATE CODE FOR MALICIOUS CODE operation 238, processing transitions to a MALICIOUS CODE DETECTED check operation 240.

In MALICIOUS CODE DETECTED check operation 240, a determination is made whether or not malicious code is detected in the memory image based on the evaluation performed in operation 238. If malicious code is not detected ("NO"), from MALICIOUS CODE DETECTED check operation 240, processing transitions to EXIT operation 246 with processing exiting method 200. Alternatively, if malicious code is detected ("YES"), from MALICIOUS CODE DETECTED check operation 240, processing transitions to a TAKE PROTECTIVE ACTION operation 242.

In TAKE PROTECTIVE ACTION operation 242, protective action is taken. In some embodiments, the executable program containing malicious code is deleted from host computer system 102. In some embodiments, the malicious code and/or the executable program is automatically copied to a text file and sent to a security evaluation center.

In one embodiment, the user is prompted for input prior to taking protective action, e.g., the user is asked for permission to take protective action. From TAKE PROTECTIVE ACTION operation 242, processing optionally transitions to a NOTIFY operation 244, or transitions directly to EXIT operation 246, or optionally returns to operation 204 on receipt of a next executable program.

In optional NOTIFY operation 244, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 244, processing transitions to EXIT operation 246, or optionally returns to operation 204 on receipt of a next executable program.

Embodiments in accordance with the invention provide unpacking support for many packer formats, thus reducing the number of individual malicious code signatures needed to identify a malicious code. Embodiments in accordance with the invention permit an AV response engineer to write a malicious code signature against the actual malicious code body rather than the raw packed file, which is typically changed each time the actual malicious code body, is packed. Embodiments in accordance with the invention allow an AV product to detect repacked variants of a known malicious code threat before samples are submitted back to an AV analysis lab.

In one alternative embodiment, rather than comparing called APIs to entries in the packer API profile list to determine when unpacking is completed, the return address of each call to an API is inspected. When the return address identifies a region associated with normal application entry points, such as those typically around memory address 0x00400000, it is assumed unpacking is completed.

In another alternative embodiment, rather than comparing a called API to entries in the packer API profile list, the number of calls to an API used to reconstruct an imports table, such as the API GetProcAddress( ) is used as an indicator of unpacking completion. When a threshold number of calls to the selected API, e.g., GetProcAddress( ), is reached, it is assumed unpacking is completed.

Referring again to FIG. 1, although API-profile guided unpacking application 106 is referred to as an application, this is illustrative only. API-profile guided unpacking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and Internet network configurations, are used in other embodiments.

Herein, a computer program product comprises a medium configured to store computer readable code in accordance with an embodiment of the present invention. Some examples of computer program products are CD-ROM discs, DVDs, and servers on a network.

As illustrated in FIG. 1, this medium belongs to the computer system itself. However, the medium is also removed from the computer system. For example, API-profile guided unpacking application 106 is stored in memory that is physically located in a location different from processor 108, e.g., memory 136 of server computer system 130. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that execute API-profile guided unpacking application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, API-profile guided unpacking application 106 in accordance with one embodiment of the present invention can be implemented in a wide variety of computer system configurations. In addition, API-profile guided unpacking application 106 could be stored as different modules in memories of different devices.

For example, API-profile guided unpacking application 106 could initially be stored in server computer system 130, and as necessary, a portion of API-profile guided unpacking application 106 could be transferred to host computer system 102 and executed on host computer system 102. Consequently, part of functionality would be executed on processor 134 of server computer system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, API-profile guided unpacking application 106 is stored in memory 136 of server computer system 130. API-profile guided unpacking application 106 is transferred over network 126 to memory 112 in host computer system 102. In this embodiment, network interface 138 and I/O interface 110 would include analog modems, digital modems, or a network interface card. If modems are used, network 126 includes a communications network, and API-profile guided unpacking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer system comprising:
a memory having stored therein an application program interface (API)-profile guided unpacking application; and
a processor coupled to said memory, wherein execution of said API-profile guided unpacking application generates a method comprising:
receiving an executable program, said executable program including at least a portion of packed code;
initiating execution of said executable program in an API-monitored environment, said API-monitored environment intercepting calls to one or more APIs issued by said execution of said executable program code prior to execution of said one or more APIs, said execution of said executable program generating a memory image;
accessing a packer API profile list, said packer API profile list comprising one or more packer API profiles, each of said one or more packer API profiles further comprising a set of one or more APIs utilized by an associated known packer to unpack packed code;
intercepting a call to an API issued by said execution of said executable program, said call identifying a called API;
stalling execution of said called API;
determining whether said called API matches an API within an API set of a packer API profile in said packer API profile list;
allowing said called API to execute and allowing said executable program to continue said execution, when said determining finds said called API corresponds to an API within an API set of a packer API profile in said packer API profile list;
stopping said execution of said executable program, when said determining finds said called API does not correspond to an API within an API set of a packer API profile in said packer API profile list; and
evaluating, following said stopping, said memory image for a detection of malicious code.

2. The computer system of claim 1, the method further comprising:
taking protective action upon detection of said malicious code.

3. The computer system of claim 2, the method further comprising:
generating a notification of said detection of said malicious code.

4. A computer-implemented method comprising:
executing, on a processor, an application program interface (API)-profile guided unpacking application, wherein execution of said API-profile guided unpacking application generates said method comprising:
receiving an executable program, said executable program including at least a portion of packed code;
initiating execution of said executable program in an API-monitored environment, said API-monitored environment intercepting calls to one or more APIs issued by said execution of said executable program code prior to execution of said one or more APIs, said execution of said executable program generating a memory image;
accessing a packer API profile list, said packer API profile list comprising one or more packer API profiles, each of said one or more packer API profiles further comprising a set of one or more APIs utilized by an associated known packer to unpack packed code;
intercepting a call to an API issued by said executable program, said call identifying a called API;
stalling execution of said called API;

determining whether said called API matches an API within an API set of a packer API profile in said packer API profile list;

allowing said called API to execute and allowing said executable program to continue said execution, when said determining finds said called API corresponds to an API within an API set of a packer API profile in said packer API profile list;

stopping said execution of said executable program, when said determining finds said called API does not correspond to an API within an API set of a packer API profile in said packer API profile list; and evaluating said memory image for a detection of malicious code.

5. The computer implemented method of claim 4 further comprising:

taking protective action upon detection of said malicious code.

6. The computer implemented method of claim 4 further comprising:

generating a notification of said detection of said malicious code upon detection of said malicious code.

7. A computer implemented method comprising:

executing, on a processor, an application program interface (API)-profile guided unpacking application, wherein execution of said API-profile guided unpacking application generates said method comprising:

receiving an executable program, said executable program including at least a portion of packed code;

sandboxing said executable program in an application program interface (API)-monitored environment such that calls to one or more APIs issued by execution of said executable program are intercepted and stalled prior to execution of said one or more APIs;

accessing a packer API profile list, said packer API profile list including one or more packer API profiles and at least one validity indicator associated with each of said one or more packer API profiles, each of said one or more packer API profiles including a set of one or more APIs called by an associated packer when unpacking packed code, said at least one validity indicator indicating whether an associated packer API profile is valid;

setting each said at least one validity indicator for each of said one or more packer API profiles as valid;

initiating execution of said executable program in said API-monitored environment, said execution generating a memory image;

intercepting a call to an API issued by said execution of said executable program, said call to an API identifying a called API;

stalling execution of said called API;

selecting a packer API profile in said packer API profile list;

determining whether said packer API profile is valid;

determining whether a next packer API profile is present in said packer API profile list, when said determining whether said packer API profile is valid finds said packer API profile is not valid;

determining whether said called API is identified in said packer API profile, when said determining whether said packer API profile is valid finds said packer API profile is valid;

determining whether a next packer API profile is present in said packer API profile list, when said determining whether said called API is identified in said packer API profile finds said called API is identified in said packer API profile;

setting a validity indicator associated with said packer API profile as invalid, and determining whether a next packer API profile is present in said packer API profile list, when said determining whether said called API is identified in said packer API profile finds said called API is not identified in said packer API profile;

selecting a next packer API profile in said packer API profile list, when said determining whether a next packer API profile is present in said packer API profile list finds said next packer API profile is present in said packer API profile list;

determining whether at least one packer API profile in said packer API profile list is set as valid, when said determining whether a next packer API profile is present in said packer API profile list finds said next packer API profile is not present in said packer API profile list; and evaluating said memory image for a detection of malicious code, when said determining whether at least one packer API profile in said packer API profile list is set as valid finds said at least one packer API profile in said packer API profile list is not set as valid.

8. The computer implemented method of claim 7 further comprising:

taking protective action, upon detection of said malicious code.

9. The computer implemented method of claim 7 further comprising:

determining whether said called API is safe, when said at least one packer API profile in said packer API profile list is set as valid; and allowing said call to an API to execute, and returning control to said executable program, when said called API is safe.

10. The computer implemented method of claim 9 further comprising:

determining whether to emulate said called-API, when said determining whether said called API is safe finds said called API is not safe; and emulating said call to an API, when said determining whether to emulate said called API makes a determination to emulate said called API, wherein said emulating returns control to said executable program.

11. The computer implemented method of claim 10 further comprising:

evaluating said memory image for a detection of malicious code, when said determining whether to emulate said called API makes a determination not to emulate said called API.

* * * * *